United States Patent
Kawano

(10) Patent No.: US 10,466,656 B2
(45) Date of Patent: Nov. 5, 2019

(54) OPERATION AUTOMATION APPARATUS AND METHOD, AND STORAGE MEDIUM

(71) Applicant: HITACHI, LTD., Tokyo (JP)

(72) Inventor: Hiroki Kawano, Tokyo (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 15/554,261

(22) PCT Filed: Jul. 30, 2015

(86) PCT No.: PCT/JP2015/071627
§ 371 (c)(1),
(2) Date: Aug. 29, 2017

(87) PCT Pub. No.: WO2017/017836
PCT Pub. Date: Feb. 2, 2017

(65) Prior Publication Data
US 2018/0052430 A1  Feb. 22, 2018

(51) Int. Cl.
G05B 11/01 (2006.01)
G06N 5/02 (2006.01)
G06F 3/06 (2006.01)

(52) U.S. Cl.
CPC .......... *G05B 11/01* (2013.01); *G06F 3/0605* (2013.01); *G06F 3/067* (2013.01); *G06F 3/0631* (2013.01); *G06N 5/022* (2013.01)

(58) Field of Classification Search
CPC ....... G05B 11/01; G06F 3/067; G06F 3/0631; G06F 3/0605; G06N 5/022
See application file for complete search history.

(56) References Cited

U.S. PATENT DOCUMENTS

| 9,436,921 B2* | 9/2016 | Whitmore | G06Q 10/06 |
| 9,841,740 B2* | 12/2017 | Brown | G05B 19/4185 |
| 2014/0282519 A1* | 9/2014 | Apte | G06F 9/45533 718/1 |
| 2015/0143331 A1* | 5/2015 | Matsubara | G06F 8/31 717/115 |

(Continued)

FOREIGN PATENT DOCUMENTS

JP    2009-037531 A    2/2009

OTHER PUBLICATIONS

International Search Report of PCT/JP2015/071627 dated Nov. 2, 2015.

*Primary Examiner* — Charles R Kasenge
(74) *Attorney, Agent, or Firm* — Mattingly & Malur, PC

(57) ABSTRACT

Proposed are a system operation apparatus and method, as well as a storage medium, capable of operating systems in a highly reliable manner. When a combination of components having a substantial influential relationship exists in a service template, one or more property setting rules which prescribe a value to be set as a specific property value of the influenced component are managed, whether a combination of the components having the substantial influential relationship, to which one of the property setting rules should be applied, exists in the created or updated service template is determined upon creating or updating the service template, and, when the combination exists, the corresponding property setting rule is applied and a first value prescribed in the property setting rule is set as the specific property value of the influenced component.

15 Claims, 15 Drawing Sheets

(56) References Cited

U.S. PATENT DOCUMENTS

| | | | |
|---|---|---|---|
| 2015/0159895 A1* | 6/2015 | Quam | F24F 11/006 700/275 |
| 2015/0213106 A1* | 7/2015 | Kunde | G06F 16/282 718/1 |
| 2016/0070251 A1* | 3/2016 | Brown | G05B 19/4185 700/86 |
| 2016/0247103 A1* | 8/2016 | Whitmore | G06Q 10/06 |

* cited by examiner

FIG.8

| Influencing Component | Component Name | Replication | 17A |
| | Component Version | 01.00.00 | |
| | Vendor Name | Hatachi,Ltd. | |
| Influenced Component | Component Name | Smart Provisioning | 17B |
| | Component Version | 01.00.00 | |
| | Vendor Name | Hatachi,Ltd. | |
| Set Property (Property of Influenced Component) | Property Key | provisioning.control.replicationControl | 17C |
| | Value When Influenced | true | |
| | Value When Not Influenced | false | |
| Rule Application Necessity Flag | | true | 17D |

FIG.9

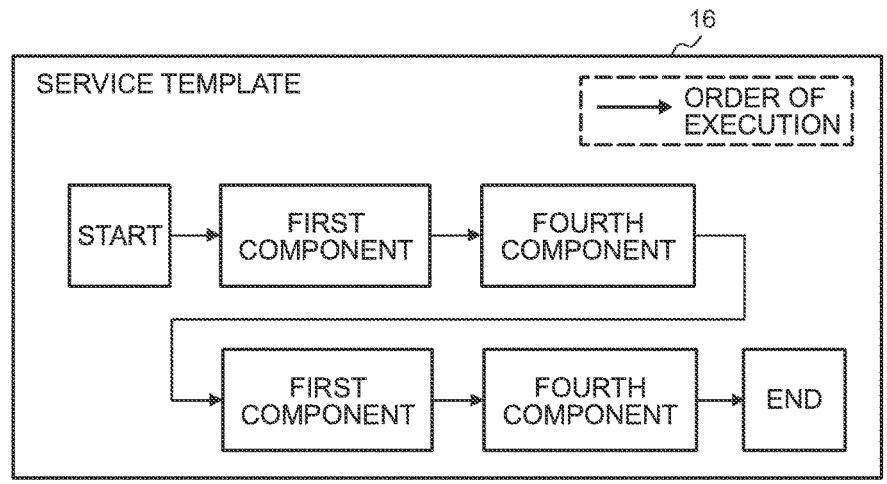

FIG.13

| Influencing Component1 | Component Name | Create Datastore |
| | Component Version | 01.00.00 |
| | Vendor Name | Hatachi,Ltd. |
| Influencing Component2 | Component Name | NNMi Installation |
| | Component Version | 01.00.00 |
| | Vendor Name | Nice Companey,Ltd. |
| Influenced Component | Component Name | Smart Provisioning |
| | Component Version | 01.00.00 |
| | Vendor Name | Hatachi,Ltd. |
| Set Property (Property of Influenced Component) | Property Key | provisioning.capacity.minValue |
| | Value When Influenced | 30GB |
| | Value When Not Influenced | |
| Rule Application Necessity Flag | | false |

FIG.16

| | | |
|---|---|---|
| Influencing Component1 | Component Name | Replication |
| | Component Version | 01.00.00 |
| | Vendor Name | Hatachi,Ltd. |
| Influencing Component2 | Component Name | NNMi Installation |
| | Component Version | 01.00.00 |
| | Vendor Name | Nice Company,Ltd. |
| Influencing Component3 | Component Name | UCMDB Installation |
| | Component Version | 01.00.00 |
| | Vendor Name | Nice Company,Ltd. |
| Influenced Component | Component Name | Smart Provisioning |
| | Component Version | 01.00.00 |
| | Vendor Name | Hatachi,Ltd. |
| Set Property (Property of Influenced Component) | Property Key | provisioning.capacity.minValue |
| | Value When Influenced | 60GB |
| | Value When Not Influenced | No Limit |
| Rule Application Necessity Flag | | false |

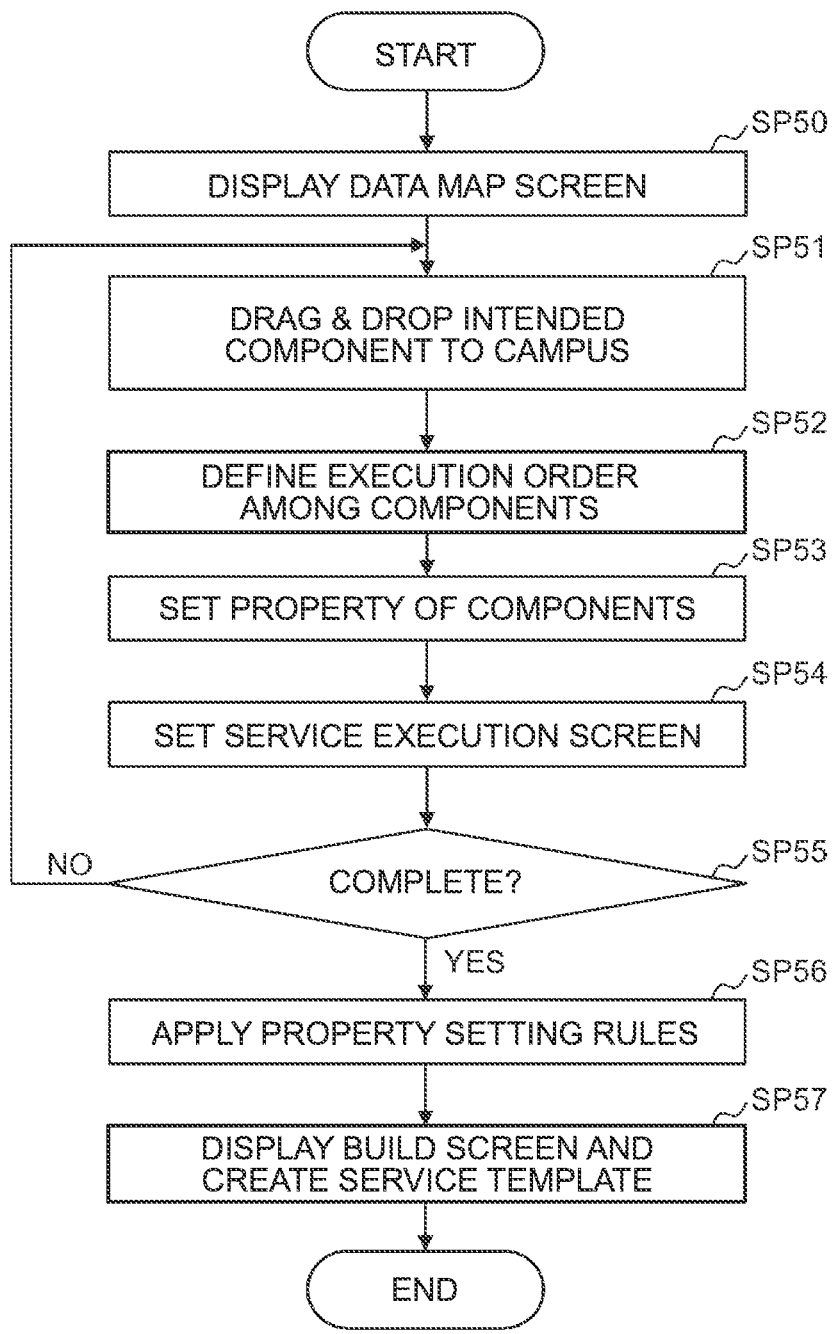

OPERATION AUTOMATION APPARATUS AND METHOD, AND STORAGE MEDIUM

TECHNICAL FIELD

The present invention relates to an operation automation apparatus and method, as well as to a storage medium, and, for example, can be suitably applied to an operation automation apparatus which automates and streamlines operations required for storage management and data center management.

BACKGROUND ART

Conventionally, software for automating and streamlining operations of storage apparatuses and server apparatuses in data centers and companies (this is hereinafter referred to as the "operation automation software") has been developed and commercialized.

This operation automation software is software that executes a series of operations to storage apparatuses and server apparatuses according to a processing routine created by combining a plurality of modules, which are also referred to as components, with processing details defined therein (this is hereinafter referred to as the "service template"), and by sequentially performing processing to the individual components.

According to this operation automation software, it is possible to automate complicated operations such as creating logical volumes within the storage apparatus or creating a data storage within the server apparatus, which were conventionally performed manually based on operation manuals, and it is thereby possible to perform efficient and smooth system operation management while preventing the occurrence of failures caused by human error.

CITATION LIST

Patent Literature

[PTL 1] Japanese Patent Application Publication No. 2009-37531

SUMMARY OF THE INVENTION

Problems to be Solved by the Invention

Meanwhile, in the operation of storage apparatuses and server apparatuses using the foregoing operation automation software, it is necessary to create a service template prescribing the order of components to be executed as described above. And, in the process of creating this kind of service template, depending on the type of component to be used, there are cases where the operation details of that component need to be changed depending on the type of the related component to be executed before or after the foregoing component.

The operation of the component can be changed by defining the property of that component. Thus, a user needs to determine the required property definition from the dependence between the components, and manually set the property of the corresponding component.

Here, when a dependence between the component is added, there are problems in that the required property definition becomes insufficient and unintended operations occur, or situations arise where an unneeded property definition remains or unintended operations occur when such substantial influential relationship between the components no longer exists.

In the foregoing case, for instance, PTL 1 discloses an invention of generating dependence information indicating the dependence of componentized I/O GUI parts, changing a display attribute value of the I/O GUI parts, a display attribute value of other I/O parts, and layout information when the value input to the I/O GUI parts does not fall within the range of the value restriction information described in the dependence information, and updating the GUI screen based on the changed information. Thus, considered may be applying this invention to the operation automation software in order to resolve the foregoing problems.

Nevertheless, with the service template created using the foregoing operation automation software, there may be cases where dependence exists between the components and cases where dependence does not exist between the components, even in a combination of the same components, depending on the description of the service intended by the developer of the service template.

Accordingly, with the method of constantly setting the definition of a specific property to a specific value when there is a combination of certain components upon creating the service template, there is a problem in that operations, which are not intended by the developer of the service template, may occur.

The present invention was devised in view of the foregoing points, and an object of this invention is to propose a system operation apparatus and method, as well as a storage medium, capable of operating systems in a highly reliable manner by effectively preventing the occurrence of unintended operations.

Means to Solve the Problems

In order to achieve the foregoing object, the present invention provides a system operation apparatus which operates a target system, in accordance with a service template created by combining one or more components with processing details defined therein, by sequentially executing each of the components configuring the service template according to an order set in the service template, comprising: a rule management unit which manages, when a combination of the components having a substantial influential relationship exists in the service template, one or more property setting rules which prescribe a value to be set as a specific property value of the influenced component; and a property setting unit which refers to each of the property setting rules being managed by the rule management unit when the service template is created or updated, and determines whether a combination of the components having the substantial influential relationship, to which one of the property setting rules should be applied, exists in the created or updated service template, and, when the combination exists, applies the corresponding property setting rule and sets a first value prescribed in the property setting rule as the specific property value of the influenced component.

The present invention additionally provides a system operation method to be executed in a system operation apparatus which operates a target system, in accordance with a service template created by combining one or more components with processing details defined therein, by sequentially executing each of the components configuring the service template according to an order set in the service template, comprising: a first step of managing, when a combination of the components having a substantial influential relationship exists in the service template, one or more property setting rules which prescribe a value to be set as a specific property value of a property of the influenced component; and a second step of referring to each of the property setting rules when the service template is created or updated, and determining whether a combination of the components having the substantial influential relationship, to which one of the property setting rules should be applied, exists in the created or updated service template, and, when the combination exists, applying the corresponding property setting rule and setting a first value prescribed in the property setting rule as the specific property value of the influenced component.

The present invention further provides a storage medium storing a program to be executed by a system operation apparatus which operates a target system, in accordance with a service template created by combining one or more components with processing details defined therein, by sequentially executing each of the components configuring the service template according to an order set in the service template, wherein the program comprises: a first step of managing, when a combination of the components having a substantial influential relationship exists in the service template, one or more property setting rules which prescribe a specific property value of the influenced component; and a second step of referring to each of the property setting rules when the service template is created or updated, and determining whether a combination of the components having the substantial influential relationship, to which one of the property setting rules should be applied, exists in the created or updated service template, and, when the combination exists, applying the corresponding property setting rule and setting a first value prescribed in the property setting rule as the specific property value of the influenced component.

According to the system operation apparatus and method as well as the storage medium of the present invention, when there is a substantial influential relationship between the components configuring the created or updated service template, it is possible to effectively prevent situations where the required property definition becomes insufficient and unintended operations occur, or situations where an unneeded property definition remains or unintended operations occur when such substantial influential relationship between the components no longer exists.

Advantageous Effects of the Invention

According to the present invention, it is possible to realize a system operation apparatus and method, as well as a storage medium, capable of operating systems in a highly reliable manner by preventing the occurrence of unintended operations.

BRIEF DESCRIPTION OF DRAWINGS

FIG. 8 is a conceptual diagram explaining the property setting rules.

FIG. 9 is a conceptual diagram explaining the property setting function according to this embodiment.

FIG. 13 is a conceptual diagram explaining the property setting rules in the service template that is created by combining three components.

FIG. 16 is a conceptual diagram explaining the property setting rules in the service template that is created by combining four components.

FIG. 17 is a flowchart showing the user's operation procedures to be taken upon creating the service template.

DESCRIPTION OF EMBODIMENTS

An embodiment of the present invention is now explained in detail with reference to the appended drawings.

(1) Configuration of Information Processing System According to this Embodiment

Figure 1:
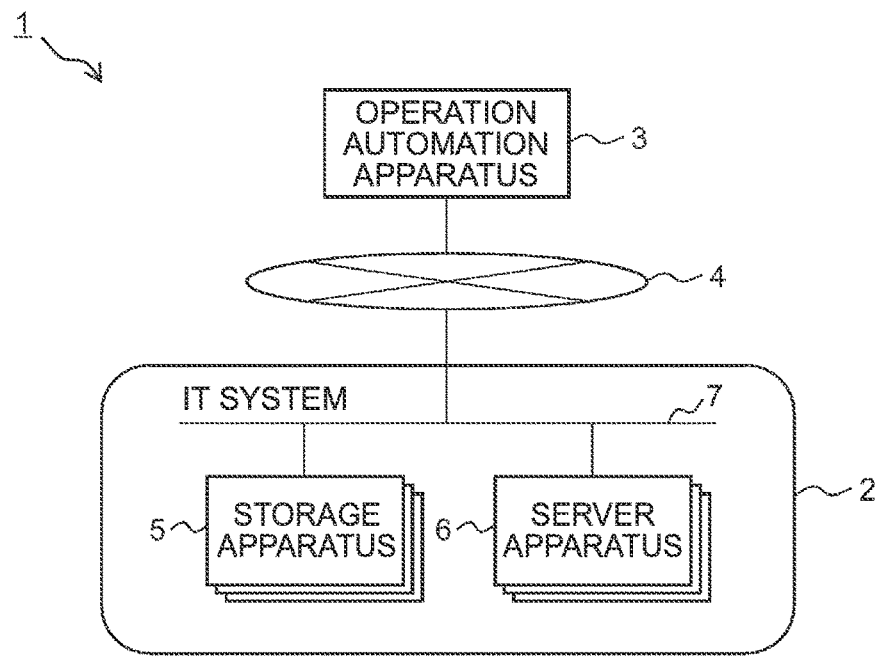
FIG. 1 is a block diagram showing the overall configuration of the information processing system according to this embodiment.

FIG. 1 shows the information processing system according to this embodiment. The information processing system 1 comprises an IT system 2 provided within a data center or a company, and an operation automation apparatus 3 for operating and managing the IT system 2, and configured by the IT system 2 and the operation automation apparatus 3 being connected via a network 4.

The IT system 2 is configured, for example, by one or more storage apparatuses 5 and one or more server apparatuses 6 being mutually connected via a network 7 such as a SAN (Storage Area Network) or a LAN (Local Area Network). The storage apparatus 5 is configured, for example, from a disk array device equipped with a plurality of hard disk devices, and the server apparatus 6 is configured, for example, from a general-purpose server apparatus loaded with software in accordance with the user's business description.

Figure 2:
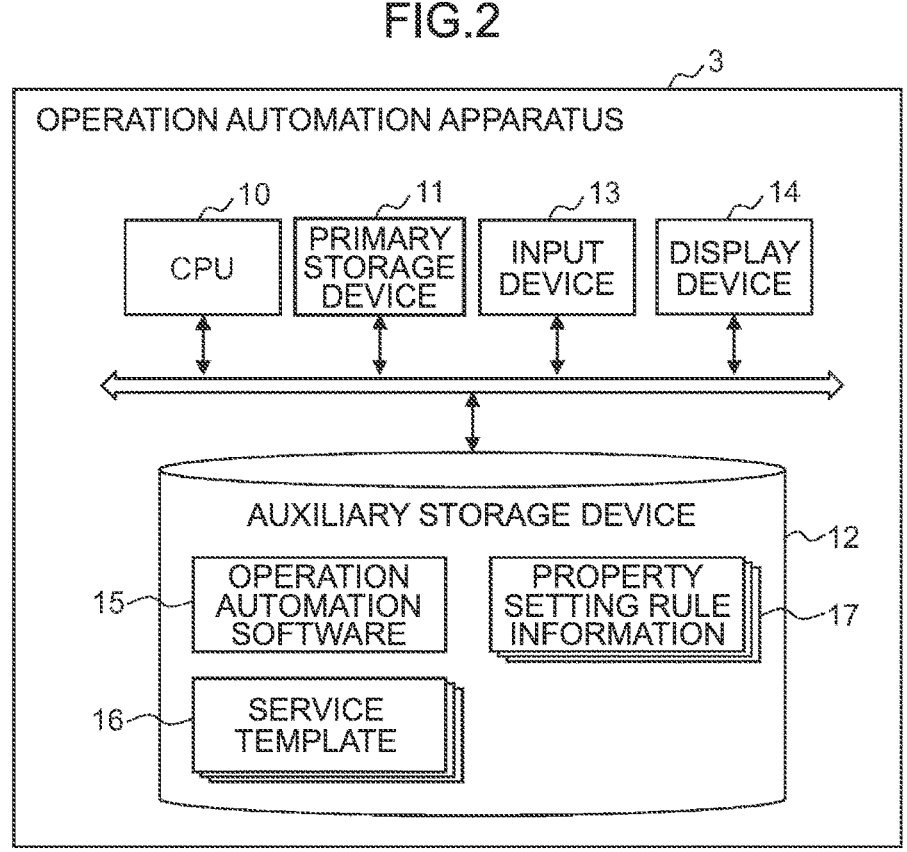
FIG. 2 is a block diagram showing the overall configuration of the operation automation apparatus according to this embodiment.

The operation automation apparatus 3 is a computer device comprising, as shown in FIG. 2, hardware resources such as a CPU (Central Processing Unit) 10, a primary storage device 11, an auxiliary storage device 12, an input device 13 and a display device 14, and is configured, for example, from a personal computer, a workstation or a mainframe.

The CPU 10 is a processor that governs the operational control of the overall operation automation apparatus 3. The primary storage device 11 is configured, for example, from a volatile semiconductor memory, and is used as the work memory of the CPU 10. The various types of processing described later are executed by the operation automation software 15 stored in the auxiliary storage device 12 being read by the primary storage device 11 when the operation automation apparatus 3 is activated or as needed, and the operation automation software 15 being executed by the CPU 10.

The auxiliary storage device 12 is configured, for example, from a large capacity storage device such as a hard disk device or an SSD (Solid State Drive), and is used for retaining various types of programs and various types of control data for a long period. The auxiliary storage device 12 stores, in addition to the operation automation software 15 described above, a plurality of service templates 16 created by the developer of the operation automation software 15 or the user, and a plurality of property setting rule information 17. Details of the property setting rule information 17 will be described later.

The input device 13 is a device for the user to perform various types of operations, and is configured, for example, from a mouse or a keyboard. The display device 14 is a device for displaying the various types of GUI (Graphical User Interface) screens described later or various types of information, and is configured, for example, from a liquid crystal display.

(2) Functions of Operation Automation Software (2-1) Basic Functions of Operation Automation Software The basic functions of the operation automation software 15 loaded in the operation automation apparatus 3 are now explained. Note that, in the ensuing explanation, the item which prescribes the execution order of one or more components is referred to as a "service template", and the item in which an execution value was input to the service template is referred to as a "service".

The operation automation software 15 is software for automating and streamlining the operation of the IT system, and provides a service plate creation platform as the environment for creating the service template 16, and a service plate execution platform as the environment for executing the created service template 16.

The service template 16 is basically configured from components as members, and properties that store the execution values of the respective components. As these properties, there is a service property that stores the user's inputs and the execution result of the component, and a plug-in property that stores the input value and the output value upon the execution of the component. However, in the ensuing explanation, when there is no need to specifically differentiate the service property and the plug-in property, they will be collectively referred to as a "property".

The operation automation apparatus 3 can display a data map screen for creating the service template 16 based on the operation automation software 15, a GUI setting screen for setting the display with the service template execution platform, a build screen for performing the operation of packaging the service template 16 created using the data map screen for use in testing and importing the packaged service template 16 into the service template execution platform, and a release screen for performing the operation of packaging the service template 16 created using the data map screen for use in operation and importing the packaged service template 16 into the service template execution platform.

Figure 3:
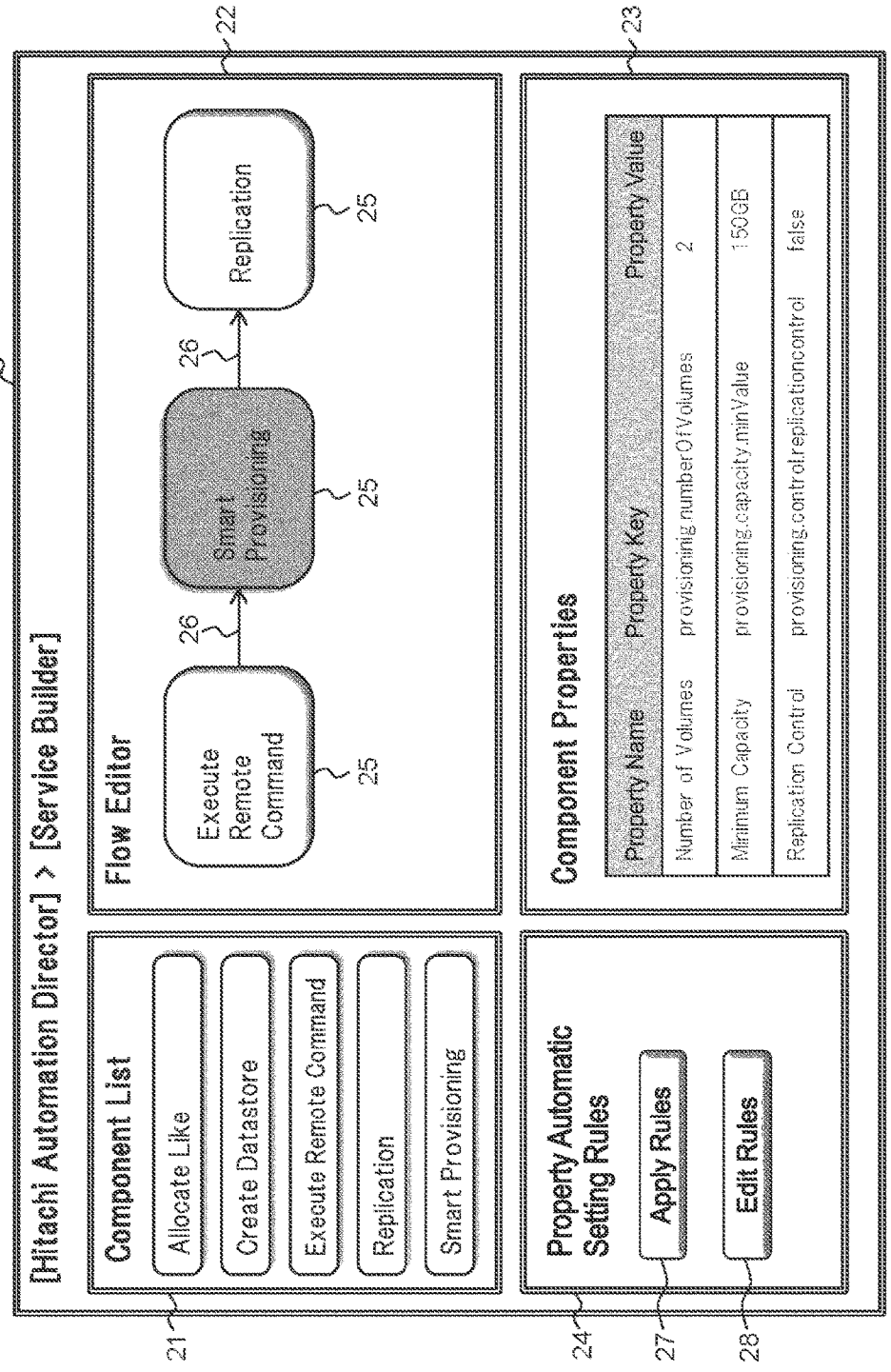
FIG. 3 is a schematic diagram schematically showing a configuration example of the data map screen.

FIG. 3 shows a configuration example of the data map screen 20 among the four screens described above. As evident from FIG. 3, the data map screen 20 is configured by comprising a component list field 21, a flow editor field 22, a property setting field 23 and a property setting rules field 24.

The component list field 21 is an area for displaying the list of available components, and the flow editor field 22 is an area for creating the service template 16. The user can create the service template 16 by sequentially pasting to the flow editor field 22, via drag-and-drop, the intended components among the respective components displayed to the component list field 21, and connecting icons 25 of these components that are consequently displayed in the flow editor field 22 with arrows 26 according to the intended execution order of the components.

The property setting field 23 is an area for setting the property of the respective components pasted to the flow editor field 22, and a list of properties that can be set for one component selected in the flow editor field 22 is displayed. The user can use the property setting field 23 and set the values of the individual properties regarding the respective components for which the icons 25 are displayed in the flow editor field 22.

The property setting rules field 24 displays an apply rules button 27 for applying the property setting rules described later to the service template 16 created in the flow editor field 22, and an edit rules button 28 for displaying an editing screen to be used for editing the property setting rules created in advance. The user can apply the corresponding property setting rules to the service template 16 by clicking the apply rules button 27 after creating the service template 16, and, by clicking the edit rules button 28, the user can display a screen for editing the property setting rules applied to the service template 16 or creating new property setting rules.

Figure 4:
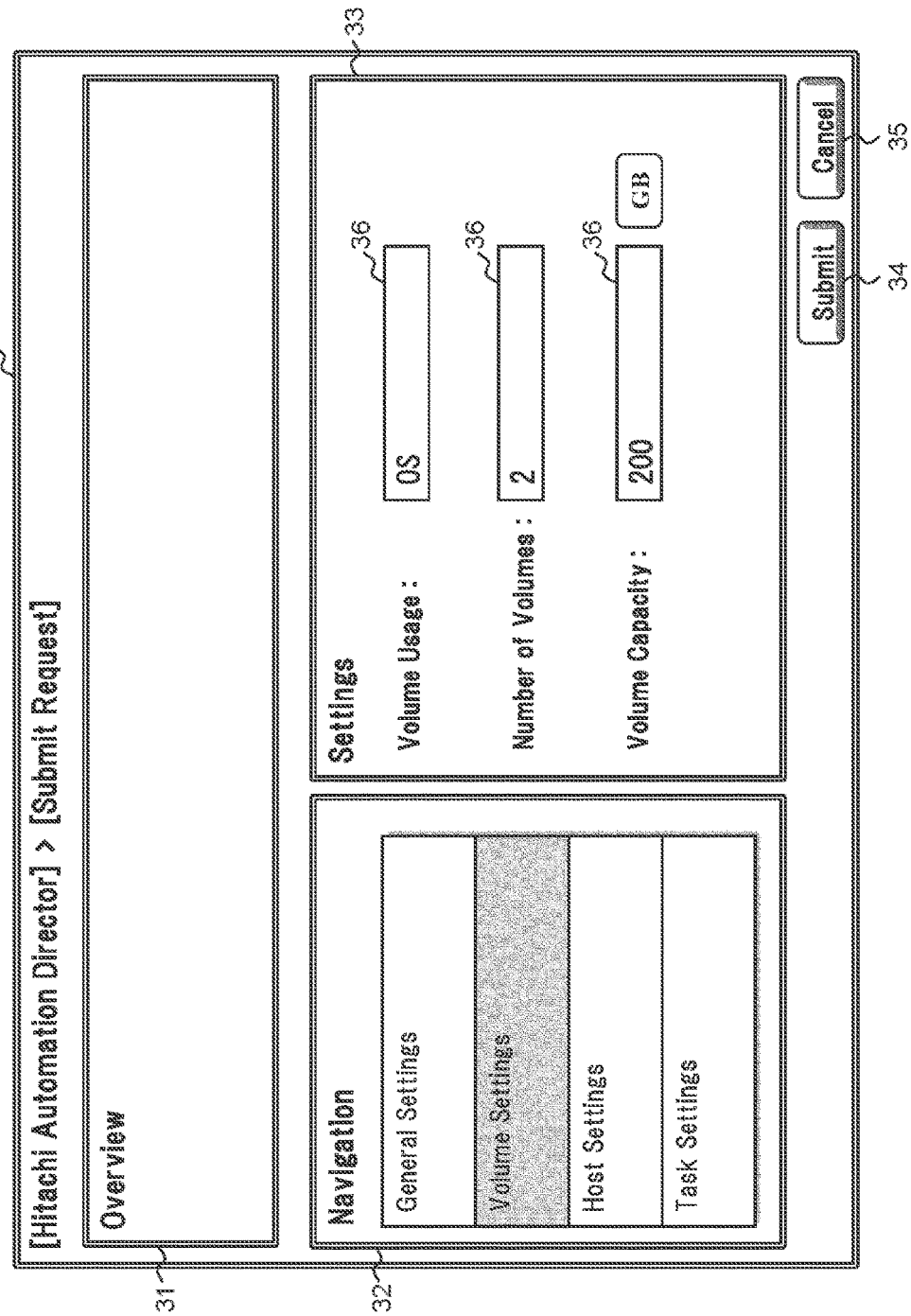
FIG. 4 is a schematic diagram schematically showing a configuration example of the service execution screen.

Meanwhile, FIG. 4 shows a configuration example of the service execution screen 30 for setting, with regard to the service template 16 that was imported into the service template execution platform, the execution value to the property of the required component and executing the service according to that service template 16.

As evident from FIG. 4, the service execution screen 30 is configured by comprising an overview field 31, a navigation field 32, a setting field 33, a submit button 34 and a cancel button 35.

The overview field 31 is an area where the description of the service based on the corresponding service template 16 is displayed. In the overview field 31, the overview of the corresponding service is displayed using figures and texts. The navigation field 32 is an area where a list of the property groups of the corresponding service template is displayed. A property group is a grouping of properties. The properties of the respective components configuring that service are managed as a property group, and a list of such property groups is displayed in the navigation field 32.

The setting field 33 is a field for setting the execution values of various types of properties belonging to the property group selected based on the user's operation among the list of property groups displayed in the navigation field 32, and can display, for example, various types of tabs such as a volume information setting tab for setting the definition capacity of the logical volume, and a host designation tab for designating the host apparatus to provide the logical volume. One or more text boxes 36 are displayed in these tabs for setting the execution values in correspondence with the respective properties that can be set among those of the property group.

Consequently, the user can use the service execution screen 30 to set the execution values of the required properties, and thereafter cause the operation automation apparatus 3 to execute the service according to the service template 16 by clicking the submit button 34. Note that the service execution screen 30 can also be closed without executing the service by the user clicking the cancel button 35.

(2-2) Property Setting Function

Meanwhile, among the components, there are those in which their operation needs to be switched when used in combination with another component. As the operations that need to be switched, there are, for instance, the switching of the display screen upon executing the service, and the switching of the internal processing based on the component.

For example, considered is a case where the storage apparatus 5 with the most superior performance is selected as the component among the storage apparatuses 5 (FIG. 1) that coincide with the performance conditions, and one service is created by combining a first component which provides the provisioning function for creating a virtual logical volume (this is hereinafter referred to as the "virtual volume") within the storage apparatus 5 to be assigned to the host (server apparatus 6 in this example), and a second component which provides the function of performing the processing from the creation of a backup logical volume to the setting of replication. Note that, upon executing the second component, a replication license is required for the storage apparatus 5 to create the backup logical volume.

Figure 5:
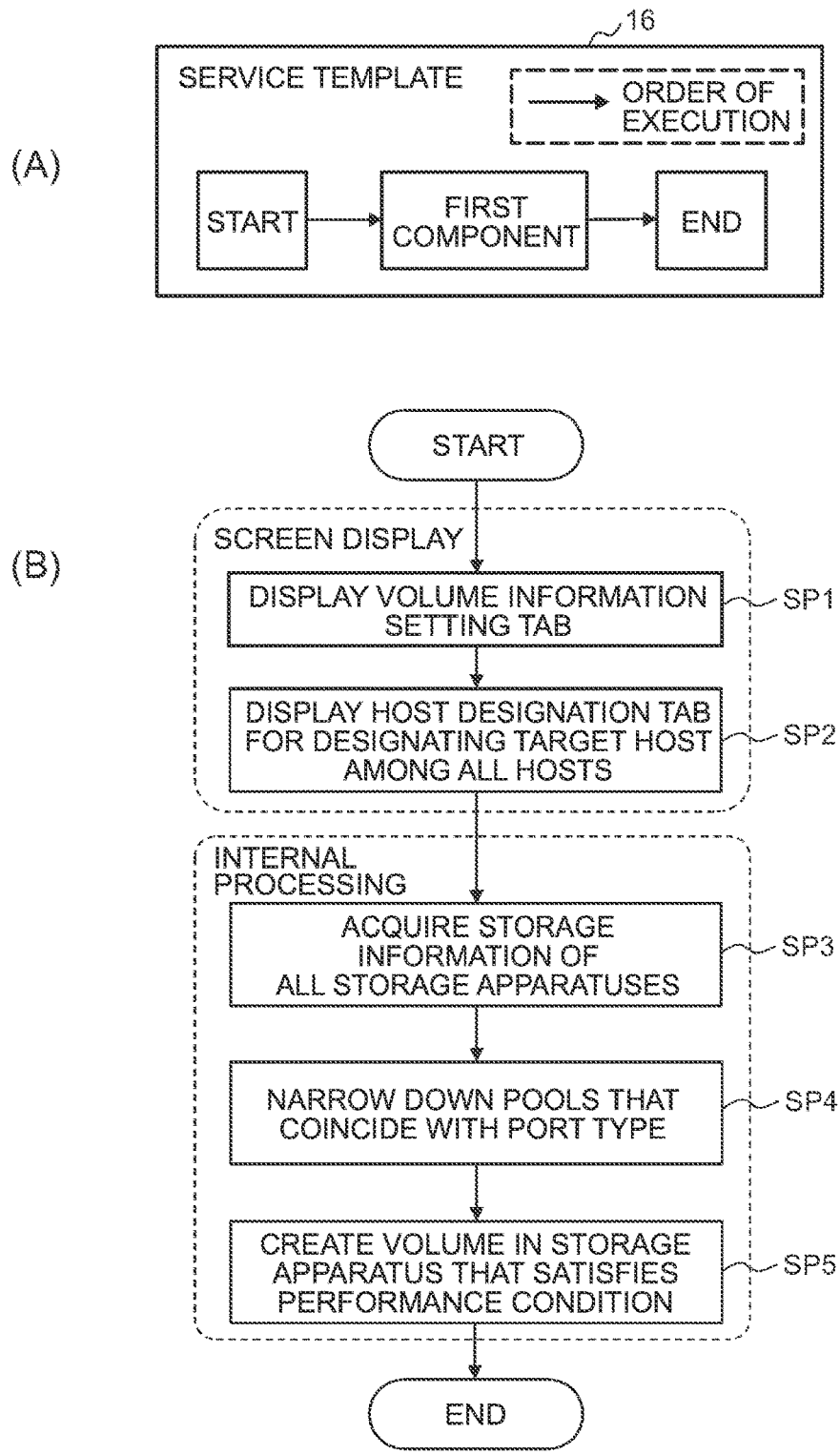
FIG. 5(A) is a conceptual diagram explaining the problems encountered in conventional technologies.
FIG. 5(B) is a flowchart showing the details of the processing to be executed by the first component in the foregoing case.

The flow of the processing performed by the operation automation apparatus 3 upon executing the first component in cases of using the first component as a stand-alone component as shown in FIG. 5(A) is foremost explained. In the foregoing case, the service of the flow as shown in FIG. 5(B) is provided based on the first component.

In other words, foremost, the operation automation apparatus 3 displays a volume information setting tab for setting the performance conditions, such as the definition capacity, of the virtual volume to be created in the setting field 33 of the service execution screen 30 described above with reference to FIG. 4 (SP1). When the performance conditions of the virtual volume are set by the user using the volume information setting tab, the operation automation apparatus 3 switches the display of the setting field 33 of the service execution screen 30 to a host designation tab (not shown) for designating the server apparatus 6 to provide the virtual volume among all hosts (server apparatuses 6 in this example) existing in the IT system 2 (FIG. 1) (SP2).

Subsequently, when the server apparatus 6 of the provision destination of the virtual volume is designated by the user using the host designation tab, the operation automation apparatus 3 collects and acquires information (storage information) related to the performance and configuration of all storage apparatuses 5 existing in the IT system 2 (SP3). Moreover, the operation automation apparatus 3 narrows down the pools (storage areas to assign a physical storage area to the foregoing virtual volume) that coincide with the port type of the server apparatus 6 designated in step SP2 based on the storage information of the respective storage apparatuses 5 acquired in step SP3 (SP4), and thereafter creates the foregoing virtual volume in the storage apparatus 5 that coincides with the performance conditions set in step SP1 (SP5).

Figure 6:
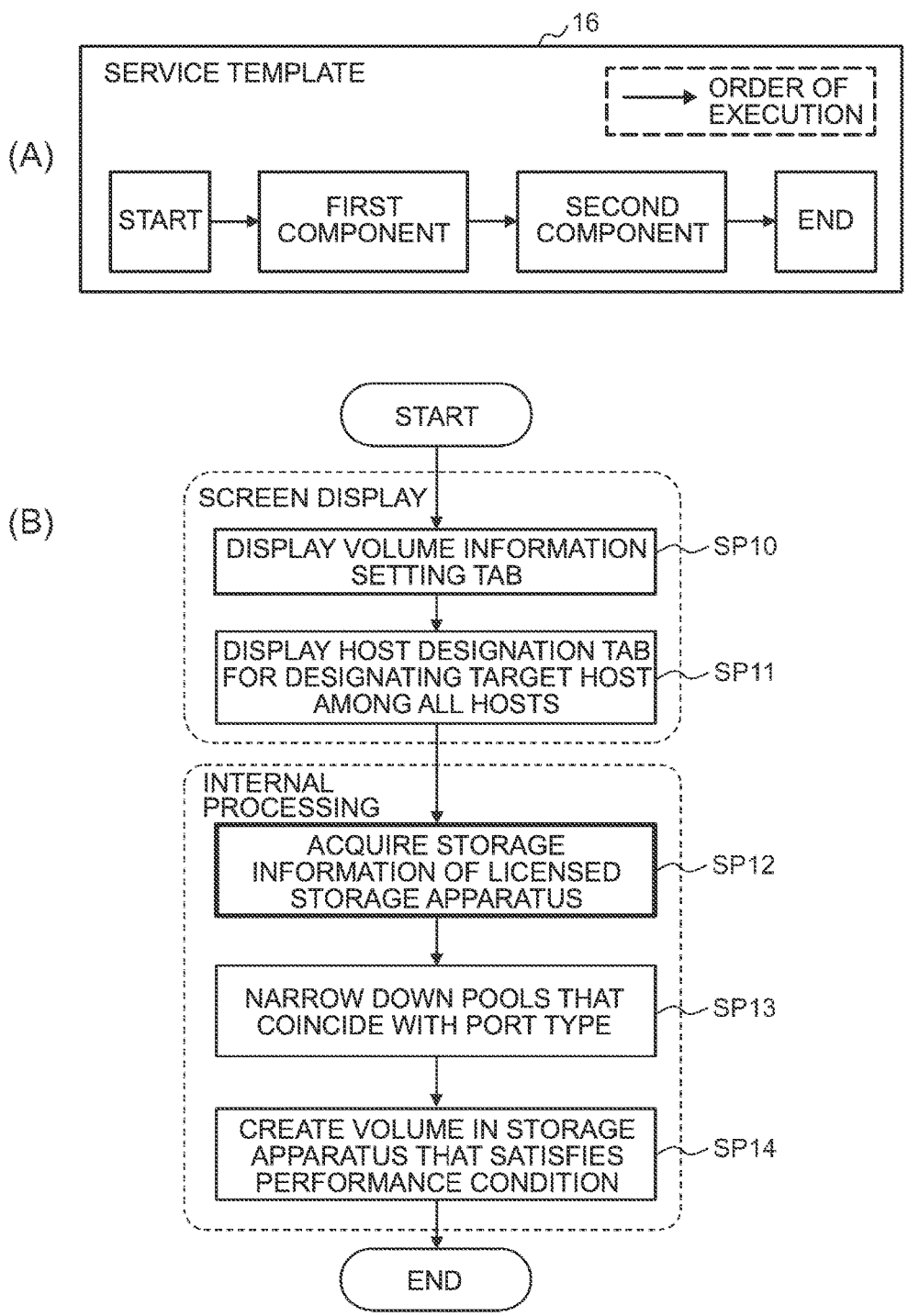
FIG. 6(A) is a conceptual diagram explaining the problems encountered in conventional technologies.
FIG. 6(B) is a flowchart showing the details of the processing to be executed by the first component in the foregoing case.

Meanwhile, as shown in FIG. 6(A), when creating a service by combining a first component and a second component so that the processing of the second component is executed after the processing of the first component, upon executing the first component, rather than acquiring the storage information from all storage apparatuses 5 in the IT system as in step SP3 of FIG. 5(B), it is necessary to acquire storage information only from the storage apparatuses 5 having a replication license as shown in step SP12 of FIG. 6(B). This is because, when a storage apparatus 5 that does not have a license is selected upon executing the first component, it is not possible to set the replication in that storage apparatus 5 upon executing the second component. The remaining processing details in FIG. 6(B) are the same as FIG. 5(B).

Figure 7:
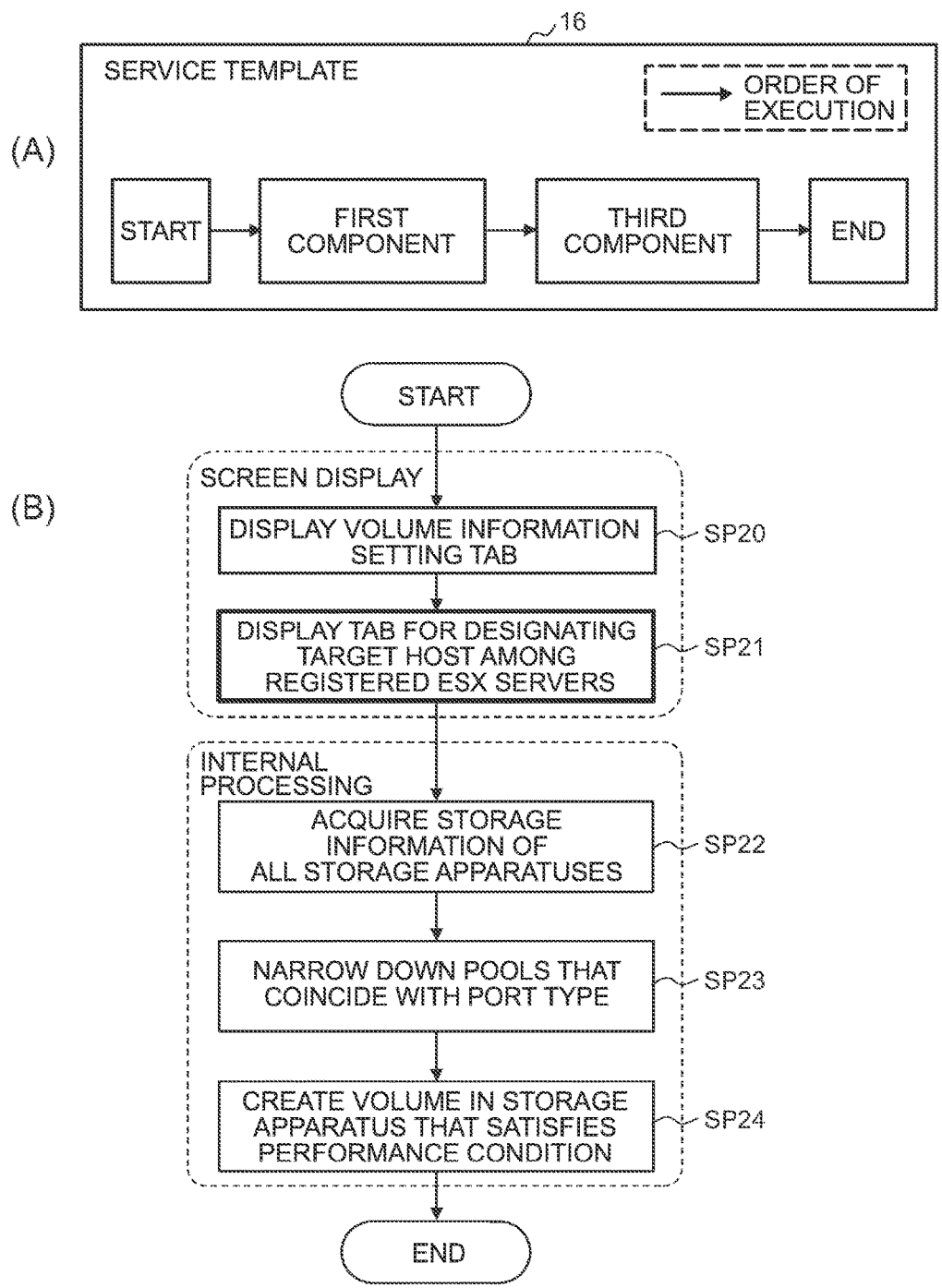
FIG. 7(A) is a conceptual diagram explaining the problems encountered in conventional technologies.
FIG. 7(B) is a flowchart showing the details of the processing to be executed by the first component in the foregoing case.

Moreover, as shown in FIG. 7(A), considered is a case of creating one service by combining the foregoing first component, and a third component which provides the function of creating, within the storage apparatus 5, a data storage for a server apparatus loaded with a hypervisor known as VMware ESX (name of product manufactured by VMware) (this is hereinafter referred to as the "ESX server apparatus") 6 (FIG. 1).

In the foregoing case, as shown in FIG. 7(B), upon displaying the host designation tab in the setting field 33 of the service execution screen 30 upon executing the first component (SP21), it is necessary to display, as the host candidates, only the ESX server apparatuses 5 registered in the vCenter in advance, and not all server apparatuses 6 that could become the host as in step SP2 of FIG. 5(B). This is because, as described above, the third component is unable to create a data storage for a host other than the ESX server apparatus. The remaining processing details in FIG. 7(B) are the same as FIG. 5(B).

In addition, the service template 16 is sometimes edited by the user pursuant to the user's business description. When the type or execution order of the components configuring the service template 16 is changed, there are cases where the operation of changing the properties of the required components in correspondence with the combination of components needs to be performed on a case-by-case basis. Here, when the setting of a required property is omitted or the setting of an unneeded property remains, an unintended service operation may occur, and cause a failure.

For instance, as an example of the former, when performing an editing process of adding the second component as shown in FIG. 6(A) to the service template 16 of FIG. 5(A), a storage apparatus 5 without a license will be selected upon executing the first component if the required properties are not set in the first component, and an error (failure) will occur because the replication cannot be set upon executing the second component.

Moreover, as an example of the latter, when performing an editing process of deleting the second component from the service template 16 described above with reference to FIG. 6(A) using the first component as a stand-alone component as shown in FIG. 5(A), the intended operation of "creating a logical volume in the storage apparatus 5 with the most superior performance among all storage apparatuses 5" is not performed, and the operation of "creating a logical volume in the storage apparatus 5 with the most superior performance among the storage apparatuses 5 with a license" is performed, and there is a problem in that an operation that is different from the intended service is performed. Moreover, in the foregoing case, because the execution of the service itself will be successful, it is unlikely that the user will recognize that the internal logic has been switched, and the problem may continue for a long time.

In light of the foregoing points, the operation automation apparatus 3 of this embodiment is equipped with a property setting function which determines, when the service template 16 is created or updated, a combination of the components in the created or updated service template 16, and, when it is necessary to set one of the property values of one of the components to a value that is different from the normal value, sets the property value to such value.

Specifically, when a component that influences the operation of another component (this is hereinafter referred to as the "influencing component") and a component that is influenced by the influencing component (this is hereinafter referred to as the "influenced component") exist in the same service template 16, the operation automation apparatus 3 of this embodiment retains, in the auxiliary storage device 12 (FIG. 1), information (this is hereinafter referred to as the "property setting rule information") 17 (FIG. 1) related to the property setting rule that prescribes the specific property value of the influenced component. The property setting rule information 17 exists in a quantity corresponding to the number of combinations of the influencing component and the influenced component that is influenced by the influencing component, and the number of properties to be changed for each of these combinations.

The property setting rule information 17 is configured in the form of a table comprising, for example, as shown in FIG. 8, an influencing component column 17A, an influenced component column 17B, a set property column 17C and a rule application necessity flag column 17D.

The influencing component column 17A stores a name ("component name") and a version ("component version") of the influencing component, and a vender name ("vender name") of the influencing component, and the influenced component column 17B stores the "component name", the "component version" and the "vender name" of the influenced component, respectively. Note that, in FIG. 8, the component name of the first component is "Smart Provisioning", and the component name of the third component is "Replication".

Moreover, the set property column 17C stores a property key for designating the property value to be changed among the properties of the influenced company to which a value should be set when a corresponding influencing component and an influenced component exist in the same service template 16, a value "value when influenced") to be set to the property value of the influenced component when the influencing component will influence the influenced component, and a value ("value when not influenced") to be set to the property value of the influenced component when the influencing component will not influence the influenced component or when the influencing component and the influenced component do not exist in the same service template, respectively.

Furthermore, the rule application necessity flag column 17D stores a rule application necessity flag indicating whether the property setting rule should be applied only when there is property referral in the influencing component and the influenced component. The rule application necessity flag is set to "true" when the property setting rule is to be applied only when there is property referral in the influencing component and the influenced component, and set to "false" when the property setting rule is to also be applied even when there is no property referral in the influencing component and the influenced component. Details of the property referral will be described later.

When the apply rules button 27 of the property setting rules field 24 is clicked after the service template 16 is created or updated using the data map screen 20 described above with reference to FIG. 3, the operation automation apparatus 3 sequentially compares the created or updated service template 16 with all property setting rules, and, when a combination of an influencing component and an influenced component that are subject to any one of the property setting rules exists in that service template 16, sets the foregoing "value when influenced" prescribed in that property setting rule to the corresponding property value of the influenced component.

In the foregoing case, irrespective of whether the influencing component and the influenced component are of a relationship of being successively executed (relationship in which the corresponding icons 25 in the flow editor field 22 of the data map screen 20 are connected with the arrow 26), the operation automation apparatus 3 applies the property setting rule when the influencing component is of a relationship that substantially influences the influenced component (this is hereinafter referred to as the "substantial influential relationship").

For example, as shown in FIG. 9, when a service template 16 is created by combining a fourth component which provides the function of outputting logs of the respective execution results immediately after the first and second components, while the first and second components are not of a relationship of being successively executed, because the second component will be influenced by the first component, the first and second components have a substantial influential relationship.

Thus, the operation automation apparatus 3 applies the corresponding property setting rule when there is a substantial influential relationship between the two components even when these component are not of a relationship of being successively executed, and sets the "value when influenced" prescribed in the property setting rule to the property value specified by the corresponding property key of the influenced component.

Here, the "substantial influential relationship" is explained in further detail. For example, in a service template 16 as shown in FIG. 10, considered is a case where the developer of the service template 16 is intending to create a virtual volume A within the designated storage apparatus 5 and assign the created virtual volume A to the designated host (server apparatus 6) in the processing of initial first component, create a virtual volume B within the designated storage apparatus 5 and assigned the created virtual volume B to the designated host (server apparatus 6) in the processing of the subsequent first component, and create a logical volume C for use in the replication of the virtual volume B within the designated storage apparatus 5 and setting the created logical volume C as the replication destination of the virtual volume B in the processing of the third component.

In the foregoing case, the substantial influential relationship intended by the developer of the service template 16 exists between the subsequent first component and the third component, and, while there is no substantial influential relationship between the initial first component and the third component, the operation automation apparatus 3 is unable to recognize the developer's foregoing intention.

Thus, in the case of this embodiment, as a general rule, the operation automation apparatus 3 determines whether there is a "substantial influential relationship" between components based on whether or not "property referral" is being used in the properties between the components. Here, "property referral" refers to the property of a certain component referring to the property of another component. A property referral is set, for instance, when the execution result of a certain component is to be used as the input of another component.

Figure 10:
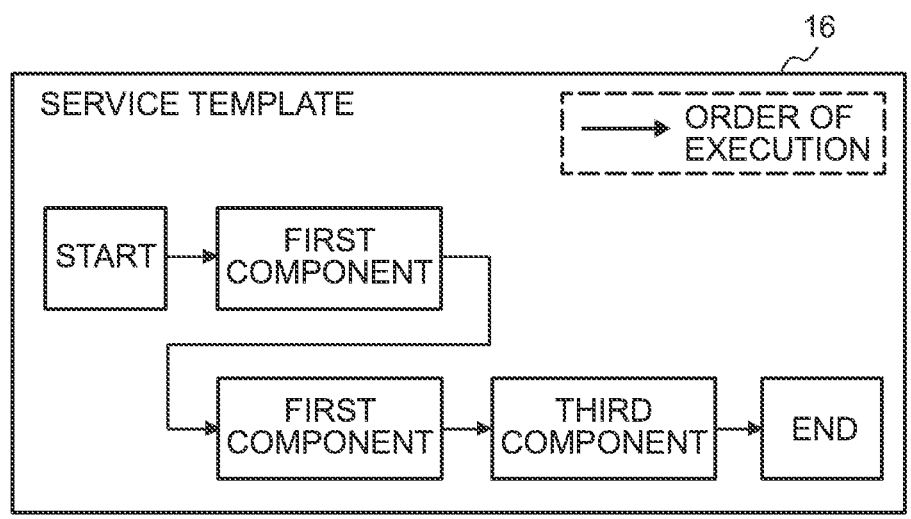
FIG. 10 is a conceptual diagram explaining the property setting function according to this embodiment.

In the example of the first and third components shown in FIG. 10, when the first and third components have a substantial influential relationship, the third component is set to refer to the property of the first component as the value of its property (to use that value as is). Specifically, the third component receives, as its input, the result of the assignment of the virtual volume B executed by the subsequent first component, and assigns the backup logical volume C based on the same setting. This "property referral" is set by the developer of the service template.

Figure 11:
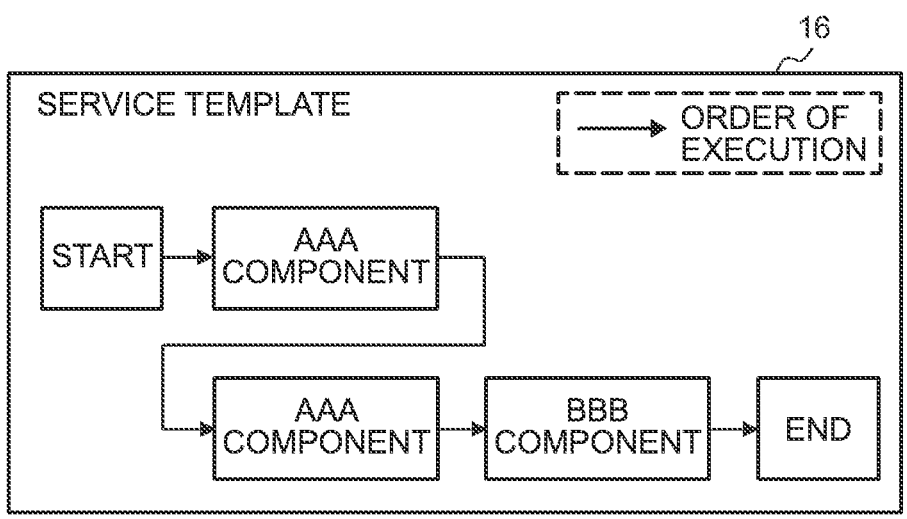
FIG. 11 is a conceptual diagram explaining the property setting function according to this embodiment.

However, even with a service template 16 as shown in FIG. 11 (there is no property referral between the first AAA component and the BBB component, but there is property referral between the second AAA component and the BBB component) having the same configuration as FIG. 10, depending on the operation details of the AAA component and the BBB component, there may be cases where the developer of the service template wishes to apply the property setting rule to both the first AAA component and the second AAA component irrespective of whether they have a property referral with the BBB component in addition applying the property setting rule only to the second AAA component having a property referral with the BBB component.

The rule application necessity flag is provided so that different measures can be taken for the former and the latter in the foregoing case, and, in the case of the former, the value of the rule application necessity flag is set to "true", and, in the case of the latter, the value of the rule application necessity flag is set to "false". As a result of using the rule application necessity flag in the manner described above, it is possible to apply the corresponding property setting rule by deeming that there is a substantial influential relationship even between components that are not using a property referral.

Note that, in the case of the operation automation apparatus 3 of this embodiment, as the property setting rule, a rule that prescribes the relationship among three or more components may be applied in addition to a rule that prescribes the relationship between two components.

Figure 12:
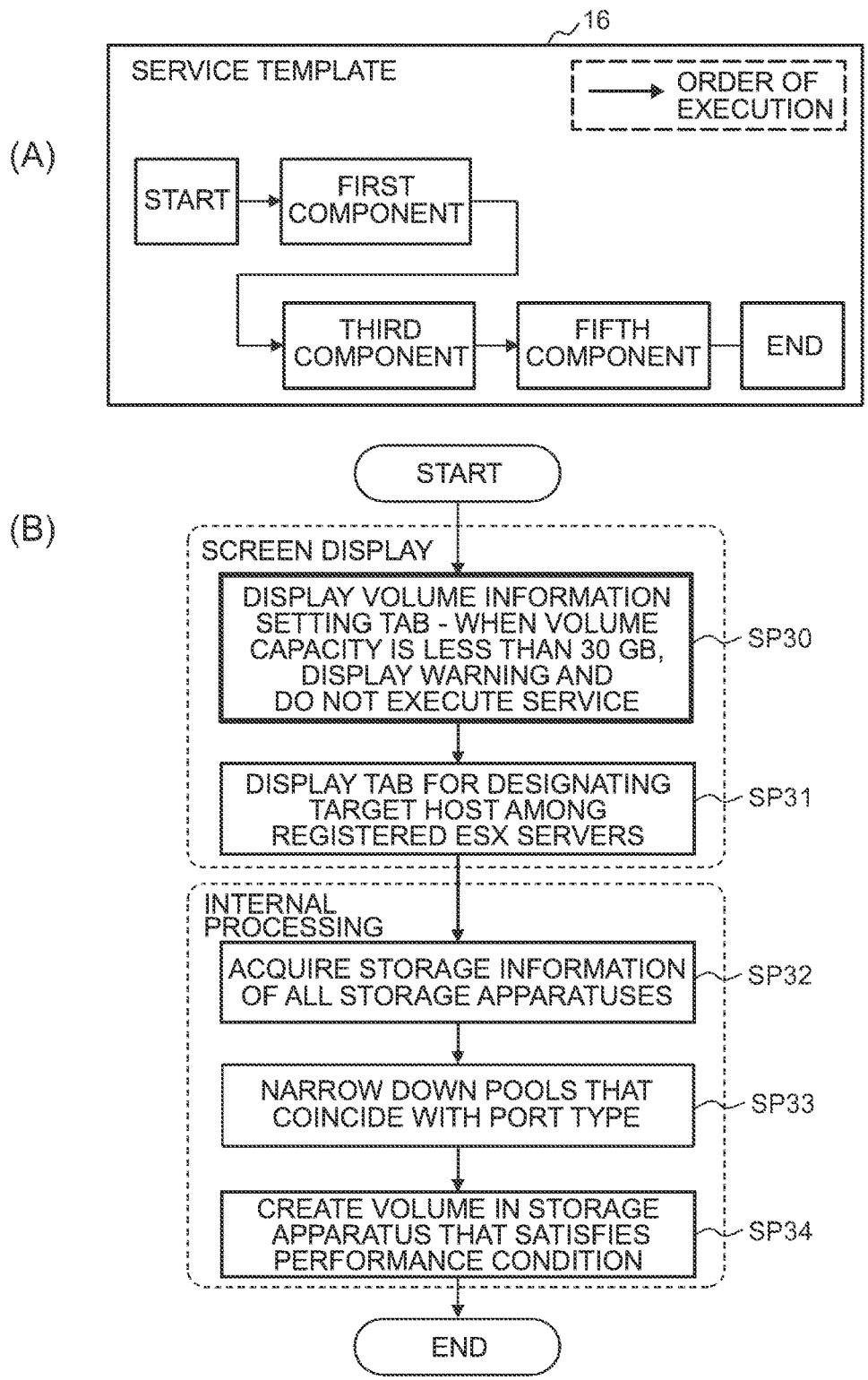
FIG. 12(A) is a conceptual diagram explaining the service template that is created by combining three components.
FIG. 12(B) is a flowchart showing the details of the processing to be executed by the first component in the foregoing case.

For example, as shown in FIG. 12(A), in a service template 16 created by combining the first and third components, and a fifth component which provides the function of installing predetermined network monitoring software in the designated host apparatus, considered is a case where the network monitoring software requests an unused capacity of "13 GB" or more as the disk capacity of the host (server apparatus 6 in this example) of the installation destination.

Here, let it be assumed that validation is granted upon executing the first component which creates a virtual volume for data storage so that only hosts having a data storage capacity of 30 GB (13 GB for the network monitoring software, and 17 GB for the OS and virtual memory) or more can be designated as the host of the installation destination of the network monitoring software.

The details of the switching of operations upon executing the first component in the service template 16 are shown in FIG. 12(B). As described above with reference to FIG. 7(B), when the fifth component does not exist, in the volume information setting tag displayed in the setting field 33 (FIG. 3) of the service execution screen 30 (FIG. 4), there is no limit in the virtual volume to be created. Nevertheless, when the fifth component is combined, a validation of displaying a warning and not executing the service is added when the capacity of the virtual volume set in the volume information setting tag is less than 30 GB (refer to step SP30). The remaining processing details in FIG. 12(B) are the same as FIG. 5(B).

The property setting rules that are created for this kind of service template 16 are shown in FIG. 13. In FIG. 13, the component name of the fifth component is "NNMi Installation". Note that, in FIG. 13, a value of an empty character string is registered as "value when not influenced", and an existing value is not registered (not allowed to be used) as the corresponding property value. The actual value to be entered depends on the installation.

Figure 14:
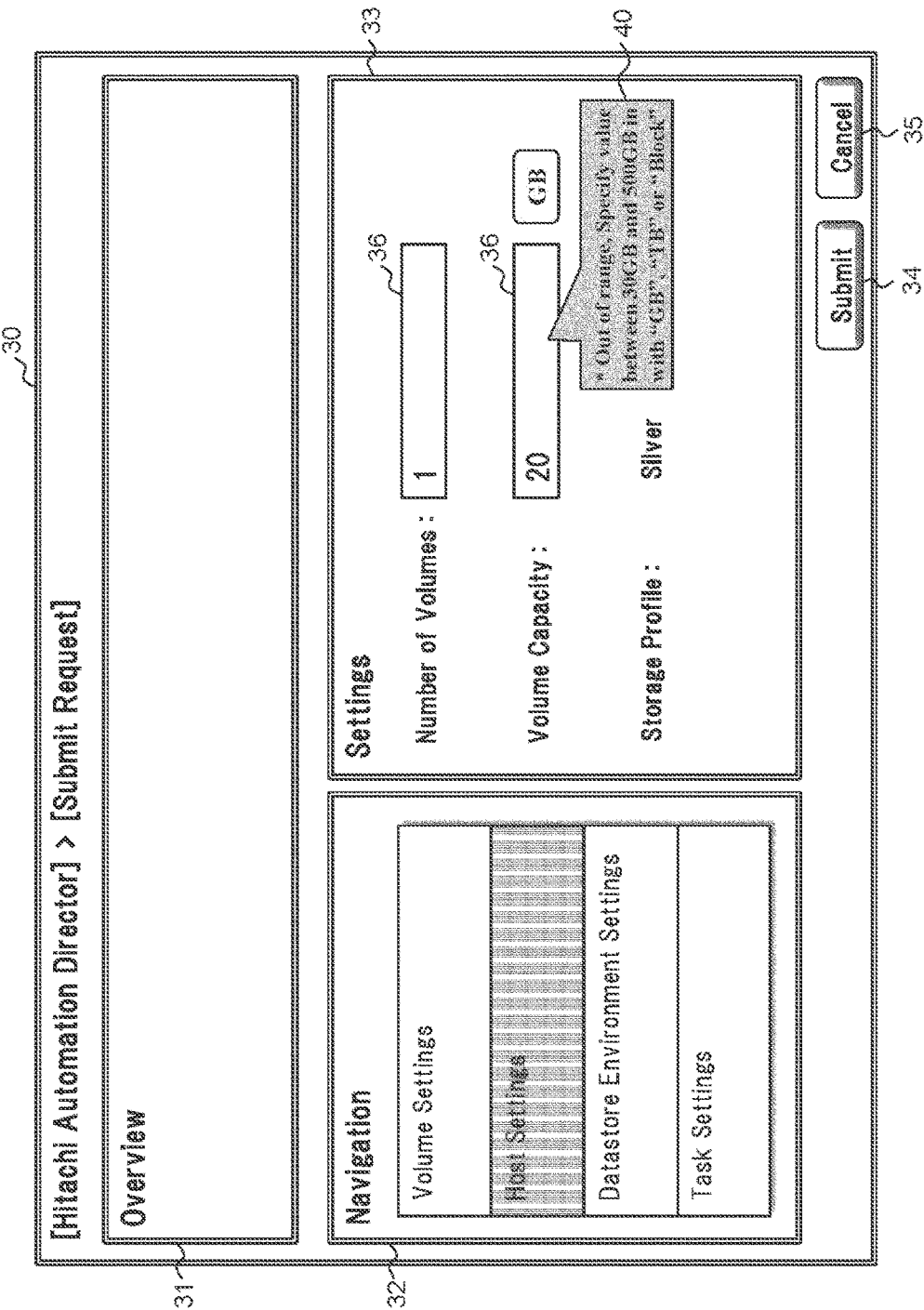
FIG. 14 is a schematic diagram explaining the validation error message.

By way of reference, an example of a validation error on the service execution screen 30 (FIG. 4) of the service template 16 to which this property setting rule was applied is shown in FIG. 14. In the example of FIG. 14, because the value of "Volume Capacity" representing the capacity of the data storage to be stored is set as "20 GB", a validation error message 40 is displayed, and the submit button is also display inactively. Because the user is unable to execute the service when this kind of validation error message is displayed, it is possible to prevent the execution of an unintended service.

Figure 15:
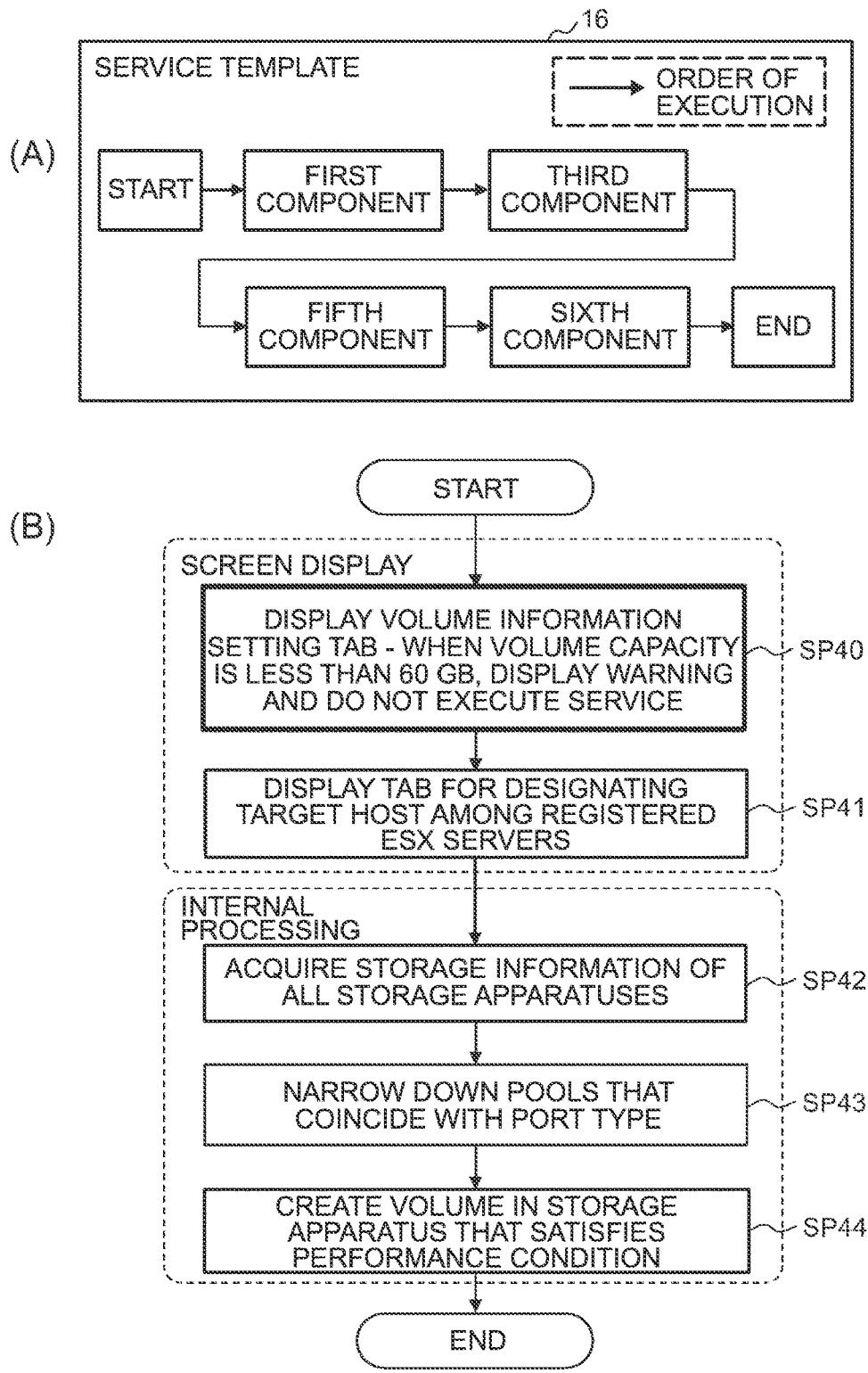
FIG. 15(A) is a conceptual diagram explaining the service template that is created by combining four components.
FIG. 15(B) is a flowchart showing the details of the processing to be executed by the first component in the foregoing case.

Furthermore, for example, as shown in FIG. 15(A), in a service template 16 created by combining the first, third and fifth components, and a sixth component which installs predetermined configuration management software in the designated host, considered is a case where the configuration management software requests an unused capacity of "30 GB" or more as the disk capacity of the host (server apparatus 6 in this example) of the installation destination.

Here, let it be assumed that validation is granted upon executing the first component which creates a volume for data storage so that only 60 GB (13 GB for the network monitoring software, 30 GB for the configuration management software, and 17 GB for the OS and virtual memory) or more can be designated as the capacity of the data storage in the host of the installation destination of the network monitoring software and the configuration management software.

The details of the switching of operations upon executing the first component in the service template 16 are shown in FIG. 15(B). When combining the fourth and fifth components, a validation of displaying a warning and not executing the service is added when the capacity of the virtual volume set by using the volume information setting tag displayed in the setting field 33 (FIG. 3) of the service execution screen 30 (FIG. 4) is less than 60 GB (refer to step SP40). The remaining processing details in FIG. 15(B) are the same as FIG. 5(B).

The property setting rules in the foregoing case are shown in FIG. 16. In FIG. 16, the component name of the fifth component is "UCMDB Installation". Note that, in FIG. 16, while "no limit" is indicated as "value when not influenced", the actual value to be entered depends on the installation.

(2-3) User's Operation Procedures Upon Creating Service Template

FIG. 17 shows the user's operations procedures to be performed upon creating the service template 16. When the user is to create a new service template 16, the user foremost operates the operation automation apparatus 3, and displays the data map screen 20 described above with reference to FIG. 3 on the operation automation apparatus 3 (SP50).

Subsequently, the user pastes to the flow editor field 22, via drag-and-drop, the intended components among the list of components displayed in the component list field 21 (FIG. 3) of the data map screen 20 (SP51).

Next, if other components already exist in the flow editor field 22, the user defines the execution order of these components by connecting the icon 25 (FIG. 3) of the component pasted to the flow editor field (this is hereinafter referred to as the "pasted component") with the icon 25 of the required components already existing in the flow editor field 22 by using the arrow 26 (FIG. 3) (SP52).

Note that, in the case of this embodiment, by clicking the icon 25 corresponding to the component to be executed first with the left mouse button and thereafter dragging that icon 25 toward the icon 25 corresponding to the component to be executed subsequently, the arrow representing the execution order can be displayed in the flow editor field 22 from the icon 25 corresponding to the component to be executed first t toward the icon 25 corresponding to the component to be executed subsequently.

Furthermore, by clicking and selecting the icon 25 of the pasted component displayed in the flow editor field 22, the user can display a list of properties of the pasted component in the property setting field 23 (FIG. 3), and thereafter set the values of the properties in the list displayed in the property setting field 23 to one's intended state (SP53).

Subsequently, the user displays a GUI setting screen (not shown), and sets the display format (for instance, visibility of the property) of the pasted component on the service execution screen 30 (SP54).

When the processing of foregoing step SP51 to step SP54 has not been executed regarding all components configuring the intended service template 16 (SP55: NO), the user subsequently performs the same processing regarding other components (SP51 to SP55-SP51).

When the user eventually pastes all components configuring the intended service template 16 to the flow editor field 22 and additionally completes the various types of settings to these components (SP55: YES), the user applies the corresponding property setting rule among the various types of property setting rules prepared in advance to the service template 16 by clicking the apply rules button 27 (FIG. 3) of the property setting rules field 24 (FIG. 3) of the data map screen 20 (SP56).

Subsequently, the user displays a build screen (not shown) on the operation automation apparatus 3, tests the service template 16 on the build screen, and, if there is no problem, causes the operation automation apparatus 3 to execute the release processing of packing the service template 16 for use in operation and importing the packed service template 16 into the template execution platform (SP57). Consequently, the service template 16 created on the data map screen 20 is thereby completed.

(2-4) Processing of CPU Related to Property Setting Function

Figure 18:
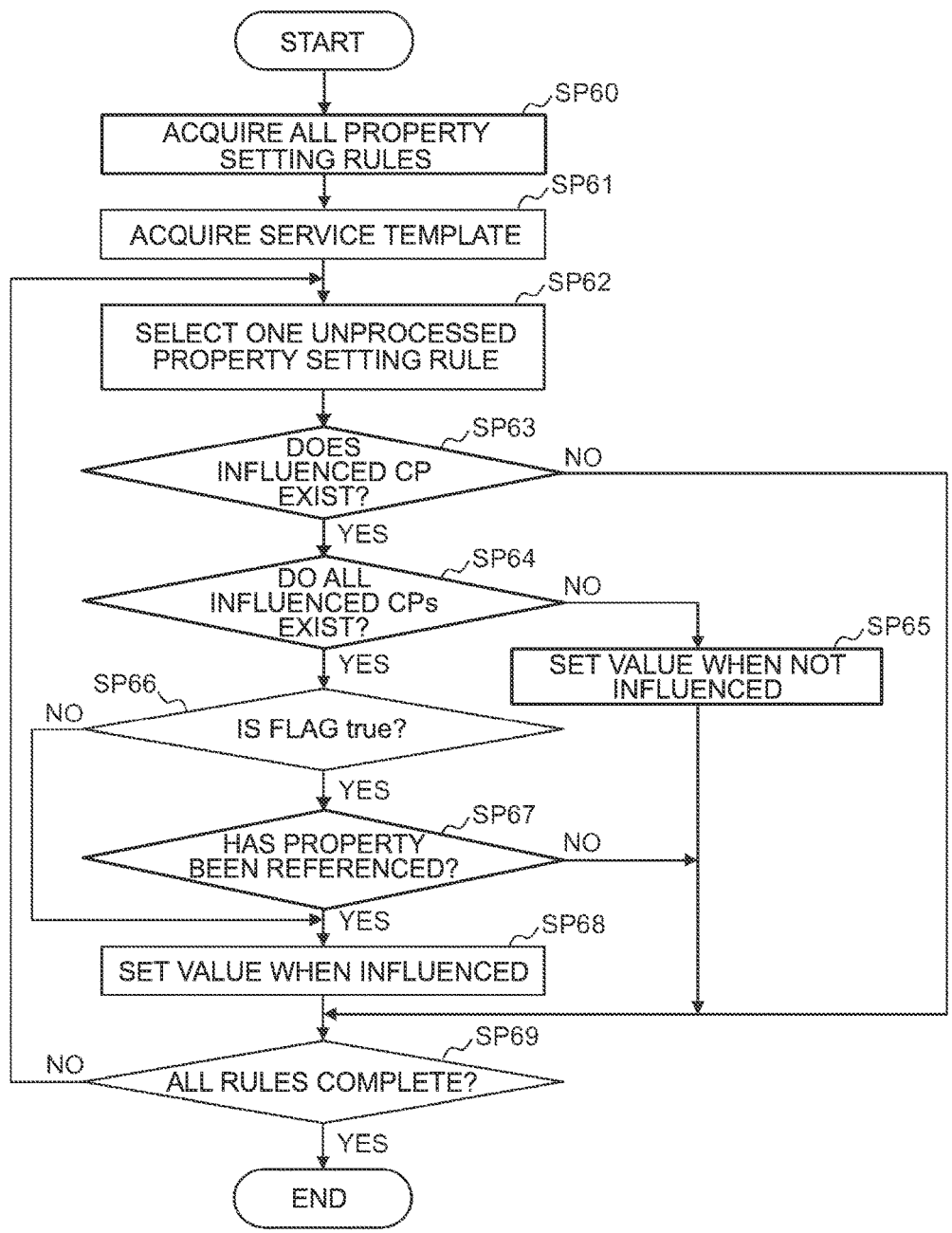
FIG. 18 is a flowchart showing the processing details of the property setting processing.

Meanwhile, the processing details of the property setting processing to be executed by the CPU 10 (FIG. 2) of the operation automation apparatus 3 when the apply rules button 27 of the property setting rules field 24 of the data map screen 20 is clicked in step SP46 of the operation procedure described above with reference to FIG. 17 are shown in FIG. 18. The CPU 10 executes the property setting processing shown in FIG. 18 according to the operation automation software 15 (FIG. 2) read into the primary storage device 11 from the auxiliary storage device 12 (FIG. 2).

In effect, the CPU 10 starts this property setting processing when the apply rules button 27 displayed in the property setting rules field 24 of the data map screen 20 is clicked, and foremost reads and acquires, from the auxiliary storage device 12, all property setting rule information 17 (FIG. 3) being managed by the operation automation software 15 (SP60). The CPU 10 additionally acquires data of the service template 16 created on the data map screen 20 (SP61).

Subsequently, the CPU 10 selects one unprocessed one property setting rule among the property setting rules for which the property setting rule information 17 was acquired in step SP60 (SP62), and determines whether the component as an influenced component in the selected property setting rule (this is hereinafter referred to as the "selected property setting rule") exists in the service template 16 for which data was acquired in step SP41 (this is hereinafter referred to as the "target service template 16") (SP63).

The CPU 10 proceeds step SP69 upon obtaining a negative result in the foregoing determination. Meanwhile, upon obtaining a positive result in the foregoing determination, the CPU 10 determines whether all components designated as an influencing component in the selected property setting rule are included as the constituent elements of the target service template 16 (SP64).

Subsequently, when the CPU 10 obtains a negative result in the foregoing determination and certain components set as an influencing component in the selected property setting rule exist in the target service template, the CPU 10 sets, with regard to such certain influencing component, the property value specified by the property key designated in the selected property setting rule to the value prescribed in the selected property setting rule as "value when not influenced" (SP65), and then proceeds to step SP69.

Meanwhile, when the CPU 10 obtains a positive result in the determination of step SP64, the CPU 10 determines whether the rule application necessity flag is set to "applied (true)" in the selected property setting rule (SP66). Subsequently, the CPU 10 proceeds to step SP68 upon obtaining a negative result in the foregoing determination.

Meanwhile, upon obtaining a positive result in the determination of step SP66, the CPU 10 acquires the property of the component corresponding to the influenced component in the selected property setting rule from the target service template 16, and determines whether there is a property referral between that influenced component and the influencing component (SP67).

The CPU 10 proceeds to step SP69 upon obtaining a negative result in the foregoing determination. Meanwhile, upon obtaining a positive result in the foregoing determination, the CPU 10 sets the value that is set as "value when influenced" in the selected property setting rule to the property value specified by the corresponding property key of the influenced component (SP68).

Subsequently, the CPU 10 determines whether the processing of step SP63 to step SP68 has been executed regarding all property setting rules for which the property setting rule information 17 was acquired in step SP60 (SP69). The CPU 10 returns to step SP52 upon obtaining a negative result in the foregoing determination, and thereafter repeats the processing of step SP62 to step SP69 while sequentially switching the property setting rule selected in step SP52 to another unprocessed property setting rule.

When the CPU 10 eventually obtains a positive result in step SP69 as a result of performing the processing of step SP63 to step SP68 regarding all property setting rules for which the property setting rule information 17 was acquired in step SP60, the CPU 10 ends this property setting processing.

(3) Effect of this Embodiment

With the information processing system 1 of this embodiment described above, the operation automation apparatus 3 refers to the respective property setting values when the service template 16 is created or updated, determines whether a combination of components having a substantial influential relationship to which one of the property setting rules should be applied exists in the created service template 16, and, when such a combination exists, applies the corresponding property setting rule, and sets the value prescribed in that property setting rule as the specific property value of the influenced component.

Thus, according to the information processing system 1 of this embodiment, when there is a substantial influential relationship between the components, it is possible to effectively prevent situations where the required property definition becomes insufficient and unintended operations occur, or situations where an unneeded property definition remains or unintended operations occur when such substantial influential relationship between the components no longer exists. Consequently, it is possible to operate the IT system 2 in a highly reliable manner.

(4) Other Embodiments

Note that, while the foregoing embodiment explained a case of configuring, with one operation automation software 15 (FIG. 1), a rule management unit which manages, when a combination of components having a substantial influential relationship exists in the service template 16, one or more property setting rules which prescribe a value to be set as a specific property value of the influenced component, and a property setting unit which refers to each of the property setting rules when the service template 16 is created or updated, and determines whether a combination of the components having the substantial influential relationship, to which one of the property setting rules should be applied, exists in the created or updated service template 16, and, when the combination exists, applies the corresponding property setting rule and sets a first value prescribed in the property setting rule as the specific property value of the influenced component. However, the present invention is not limited thereto, and, for example, the operation automation software 15 may be equipped with only the function as the foregoing rule management unit, and software with a function as a property setting unit may be prepared separately from the operation automation software 15.

Moreover, while the foregoing embodiment explained a case of configuring the data map screen 20 as shown in FIG. 2 and configuring the service execution screen 30 as shown in FIG. 3, the present invention is not limited thereto, and various other screen configurations may be broadly applied as the configuration of the data map screen 20 and the service execution screen 30.

Furthermore while the foregoing embodiment explained a case of configuring the property setting rule information 17 as shown in FIG. 8, FIG. 13 or FIG. 16, the present invention is not limited thereto, and various other configurations may be broadly applied as the configuration of the property setting rule information 17.

In addition, while the foregoing embodiment explained a case of storing the operation automation software 15 according to this embodiment in the auxiliary storage device 12 (FIG. 2), the present invention is not limited thereto, and, for example, the operation automation software 15 may also be stored in a disk-shaped storage medium such as a CD (Compact Disc) or a DVD (Digital Versatile Disc), or a portable storage medium such as a USB (Universal Serial Bus) memory, an SD memory card or other types of semiconductor memories.

INDUSTRIAL APPLICABILITY

The present invention can be broadly applied to operation automation apparatuses of various configurations which automate and streamline the operation of IT systems.

REFERENCE SIGNS LIST

1 . . . information processing system, 2 . . . IT system, 3 . . . operation automation apparatus, 5 . . . storage apparatus, 6 . . . server apparatus, 10 . . . CPU, 11 . . . primary storage device, 12 . . . auxiliary storage device, 15 . . . operation automation software, 16 . . . service template, 17 . . . property setting rule information, 20 . . . data map screen, 30 . . . service execution screen, 40 . . . validation error message.

The invention claimed is:

1. A system operation apparatus which operates a target system, comprising:
   a processor connected to a plurality of servers and a plurality of storage apparatuses and a memory storing instructions that when executed by the processor configure the processor to:
   manage, when a combination of the components having a substantial influential relationship exists in a service template created by combining one or more components with processing details, one or more property setting rules which prescribe a value to be set as a specific property value of an influenced component; and
   refer to each of the managed property setting rules when the service template is created or updated, and determine whether a combination of the components having the substantial influential relationship, to which one of the property setting rules should be applied, exists in the created or updated service template, and, when the combination exists, apply the corresponding property setting rule and sets a first value prescribed in the property setting rule as the specific property value of the influenced component, and
   sequentially executing each of the components configuring the service template according to an order set in the service template,
   wherein a substantial influential relationship between the components configuring the combination exists when a property of one of the components configuring a combination of the components refers to a property of another component configuring the combination.

2. The system operation apparatus according to claim 1, wherein the property setting rules include information indicating whether the property setting rule should be applied even when there is no substantial influential relationship between the components configuring the combination of the corresponding components, and wherein the property setting unit applies the property setting rule to the combination when the information is of a value indicating that the property setting rule should be applied even when one of the components configuring a combination of the components is not referring to a property of another component configuring that combination.

3. The system operation apparatus according to claim 2, wherein, in the property setting rules, prescribed is a second value to be set as the property value of the influenced component when a combination of the components having a substantial influential relationship does not exist, and wherein, when a combination of the components having the substantial influential relationship, to which one of the property setting rules should be applied, does not exist in the created or updated service template, the property setting unit applies the corresponding property setting value and sets the second value as the corresponding property value of the property of the influenced component.

4. The system operation apparatus according to claim 1, wherein the substantial influential relationship between the components configuring the combination exists when an execution result of one of the components configuring the combination is to be used as an input of another component configuring the combination.

5. The system operation apparatus according to claim 1, wherein the substantial influential relationship between the components configuring the combination exists when a value of the property of one of the components configuring the combination is to be used as a value of the property of another component configuring the combination.

6. A system operation method to be executed in a system operation apparatus which operates a target system, the system operation apparatus connected to a plurality of servers and a plurality of storage apparatuses, the method comprising:

a first step of managing, when a combination of the components having a substantial influential relationship exists in a service template created by combining one or more components with processing details, one or more property setting rules which prescribe a value to be set as a specific property value of a property of an influenced component; and a second step of referring to each of the managed property setting rules when the service template is created or updated, and determining whether a combination of the components having the substantial influential relationship, to which one of the property setting rules should be applied, exists in the created or updated service template, and, when the combination exists, applying the corresponding property setting rule and setting a first value prescribed in the property setting rule as the specific property value of the influenced component; and sequentially executing each of the components configuring the service template according to an order set in the service template, wherein a substantial influential relationship between the components configuring the combination exists when a property of one of the components configuring a combination of the components refers to a property of another component configuring the combination.

7. The system operation method according to claim 6, wherein the property setting rules include information indicating whether the property setting rule should be applied even when there is no substantial influential relationship between the components configuring the combination of the corresponding components, and wherein, in the second step, the property setting rule is applied to the combination when the information is of a value indicating that the property setting rule should be applied even when one of the components configuring a combination of the components is not referring to a property of another component configuring that combination.

8. The system operation method according to claim 7, wherein, in the property setting rules, prescribed is a second value to be set as the property value of the influenced component when a combination of the components having a substantial influential relationship does not exist, and wherein, in the second step, when a combination of the components having the substantial influential relationship, to which one of the property setting rules should be applied, does not exist in the created or updated service template, the corresponding property setting value is applied and the second value is set as the corresponding property value of the property of the influenced component.

9. The system operation method according to claim 6, wherein the substantial influential relationship between the components configuring the combination exists when an execution result of one of the components configuring the combination is to be used as an input of another component configuring the combination.

10. The system operation method according to claim 6, wherein the substantial influential relationship between the components configuring the combination exists when a value of the property of one of the components configuring the combination is to be used as a value of the property of another component configuring the combination.

11. A non-transitory computer readable storage medium storing a program to be executed by a system operation apparatus, which includes a processor and a memory, and which operates a target system, the program comprising:

managing, when a combination of the components having a substantial influential relationship exists in a service template created by combining one or more components with processing details, one or more property setting rules which prescribe a value to be set as a specific property value of a property of an influenced component; and referring to each of the managed property setting rules when the service template is created or updated, and determining whether a combination of the components having the substantial influential relationship, to which one of the property setting rules should be applied, exists in the created or updated service template, and, when the combination exists, applying the corresponding property setting rule and setting a first value prescribed in the property setting rule as the specific property value of the property of the influenced component; and sequentially executing each of the components configuring the service template according to an order set in the service template, wherein a substantial influential relationship between the components configuring the combination exists when a property of one of the components configuring a combination of the components refers to a property of another component configuring the combination.

12. The non-transitory computer readable storage medium according to claim 11,
    wherein the property setting rules include information indicating whether the property setting rule should be applied even when there is no substantial influential relationship between the components configuring the combination of the corresponding components, and
    wherein, in referring to each of the managed property setting rules when the service template is created or updated, the property setting rule is applied to the combination when the information is of a value indicating that the property setting rule should be applied even when one of the components configuring a combination of the components is not referring to a property of another component configuring that combination.

13. The non-transitory computer readable storage medium according to claim 12,
    wherein, in the property setting rules, prescribed is a second value to be set as the property value of the influenced component when a combination of the components having a substantial influential relationship does not exist, and
    wherein, in referring to each of the managed property setting rules when the service template is created or updated, when a combination of the components having the substantial influential relationship, to which one of the property setting rules should be applied, does not exist in the created or updated service template, the corresponding property setting value is applied and the second value is set as the corresponding property value of the property of the influenced component.

14. The non-transitory computer readable storage medium according to claim 11,
    wherein the substantial influential relationship between the components configuring the combination exists when an execution result of one of the components configuring the combination is to be used as an input of another component configuring the combination.

15. The non-transitory computer readable storage medium according to claim 11,
    wherein the substantial influential relationship between the components configuring the combination exists when a value of the property of one of the components configuring the combination is to be used as a value of the property of another component configuring the combination.

* * * * *